United States Patent [19]

Ing et al.

[11] Patent Number: 4,613,758

[45] Date of Patent: Sep. 23, 1986

[54] DIRECT READING DETECTOR/DOSIMETER FOR NEUTRONS AND OTHER HIGH LET RADIATION

[75] Inventors: Harry Ing, Deep River; Hyman C. Birnboim, Ottawa, both of Canada

[73] Assignee: Canadian Patents and Development Limited, Ottawa, Canada

[21] Appl. No.: 638,308

[22] Filed: Aug. 6, 1984

[30] Foreign Application Priority Data

Aug. 26, 1983 [CA] Canada .................................. 435413

[51] Int. Cl.$^4$ ............................ G01T 1/02; G01T 3/00
[52] U.S. Cl. ................................ 250/474.1; 250/390; 250/472.1
[58] Field of Search .................. 250/390, 472.1, 473.1, 250/474.1

[56] References Cited

U.S. PATENT DOCUMENTS 4,143,274  3/1979  Apfel ................................ 250/473.1
4,350,607  9/1982  Apfel ................................ 250/473.1
4,381,454  4/1983  Griffith et al. ................... 250/472.1

*Primary Examiner*—Carolyn E. Fields
*Attorney, Agent, or Firm*—Alan A. Thomson

[57] ABSTRACT

A direct reading detector/dosimeter for neutrons and other high LET radiation is described, comprising a selected, substantially transparent, elastic solid medium uniformly impregnated with droplets of an immiscible detector liquid. The detector liquid-in-solid is appropriately confined and rendered stable for storage by adding a layer of excess detector liquid and sealing in a container. On opening the container and removing the excess detector liquid, the detector liquid droplets become superheated and the detector/dosimeter is activated. Neutrons and other high LET radiation will trigger the vaporization of the superheated droplets and the selected elastic, solid medium will trap the products of vaporization and retain a visual record thereof over an extended time. The number of vaporization events can be counted to give a measure of the radiation dose.

14 Claims, 3 Drawing Figures

DIRECT READING DETECTOR/DOSIMETER FOR NEUTRONS AND OTHER HIGH LET RADIATION

FIELD OF THE INVENTION

This invention is concerned with the detection of neutron radiation, particularly low-energy neutron radiation, and other high LET (linear energy transfer) radiation. The method of detection exploits the fact that stored energy in the form of superheated discrete droplets of a suitable detector liquid can be released when triggered by neutrons or certain other radiations. The radiation dose can be determined by counting the number of triggered events, manifested as visible vapor pockets or local fractures or flaws in the selected elastic solid in which the droplets are suspended.

BACKGROUND TO THE INVENTION AND PRIOR ART

In the last two decades, a great deal of work has gone into the development of solid state damage track detectors (SSTD) [R. L. Fleischer, P. B. Price and R. M. Walker, Annual Rev. Nucl. Sci., 15, p. 1, 1965] for applications in various areas of radiation physics. Perhaps in no other area was the impact of these new SSTD's more striking that in neutron dosimetry where there was a shortage of other promising techniques which could be developed. About ten years ago, neutron detectors using "fission radiators" against SSTD's, such as polycarbonate ones, received a great deal of attention. The fission radiators were necessary because these SSTD's were insensitive to recoil protons but could easily detect fission fragments emitted by the radiators when exposed to neutrons.

From the viewpoint of neutron dosimetry, especially personal neutron dosimetry, there were two main problems with the fission foil SSTD's. One was the need to use fissionable materials. Aside from the regulatory problems regarding the handling of fissionable materials, the radiators emitted gamma radiation which provided unnecessary exposure to the user of the dosimeter—even though this was usually small. The second was the lack of a fissionable material which could respond primarily to neutrons in the energy region between say 10 keV to 0.5 MeV. Nature has simply not provided us with materials having the desired neutron cross-section. Unfortunately, this energy region is quite important for neutron dosimetry because a large fraction of the neutron dose in radiation protection can be delivered by such neutrons.

The advent of more sensitive plastics such as the amphorous thermoset plastic called CR-39 [B. G. Cartwright, E. K. Shirk and P. B. Price, Nucl. Inst. Meth., 153, p. 457, 1978] eliminated the problem of fission radiators. Especially when used with electrochemical etching [L. Tommasino, "Electrochemical Etching of Damaged Track Detectors by H.V. Pulse and Senosoidal Waveforms", Report No. RT/PROT(71), 1970, Comitato Nazionals Energia Nucleare, Rome], these plastics can detect recoil carbon ions and protons from interactions with neutrons as low in energy as 100 keV [R. V. Griffiths, J. H. Thorngate, K. J. Davidson, D. W. Rueppel, J. C. Fisher, L. Tommasino, G. Zapparolli, Rad. Prot. Dos., Volume 1, page 61, 1981]. However, it is clear there is a lower energy limit below which SSTD's are insensitive. Below of the order of about 100 keV, neutrons would probably not have enough energy to damage the detector medium to the extent that chemical reagents can identify the site and preferentially attack the damage. It appears that to measure such neutrons, the detector cannot be passive, but must contain stored energy in some form. In such a detector, the stored energy can be utilized to amplify the effect of the secondary particles from the neutron interactions in much the same way that a Geiger counter uses electrical energy to amplify the initial ionizations or a cloud chamber uses stored energy in the form of supercooled vapor to visualize particle tracks.

A method of providing stored energy, in the case of a liquid medium, is to superheat the liquid. One of the earliest applications of using superheated liquids for the detection of radiation was the bubble chamber, invented by Glaser [D. A. Glaser, Phys. Rev. 87, p. 665, 1952]. In this detector, ionizing particles, traversing a superheated liquid, cause bubbles to grow along the track to a size at which they may be photographed before uncontrolled boiling occurs throughout the medium. The liquid was superheated by dropping suddenly the pressure inside the containment using a piston or a diaphragm. Other methods of superheating liquids were used in work connected with so-called "cavitation studies". Researchers such as Lieberman [D. Lieberman, "Radiation-Induced Cavitation", Phys. of Fluids 2, p. 466, 1958], Hahn [B. Hahn and R. N. Peacock, "Ultrasonic Cavitation Induced by Neutrons", Nuova Cemento XXVIII, p. 1880, 1963], West [C. West and R. Howlett, "Some Experiments on Ultrasonic Cavitation using a Pulsed Neutron Source", Brit. J. Appl. Phys., 1, p. 247, 1968], and Skripov [V. P. Skripov, "Metastable Liquids", Halsted Press, John Wiley and Sons, New York, 1974], were experimenting with the effect of radiation on liquids under stress. They were superheating the liquid, such as acetone or Freon (R) compounds, or allowing drops on one liquid to rise in another liquid having a temperature gradient until the drops were superheated. They found that radiation such as gamma rays or neutrons will trigger the volatilization of the superheated liquid. These events produced audible sound which could be detected by microphones.

R. E. Apfel ["The Superheated Drop Detectors", Nucl. Inst. Meth. 162, p 603, 1979; U.S. Pat. No. 4,143,274, Mar. 6, 1979; "Photon-Insensitive, Thermal to Fast Neutron Detector", Nucl. Inst. Meth. 179, p. 615, 1981; "Thermal to Fast Neutron Detector with Superheated Drops", Eighth DOE Workshop on Personnel Neutron Dosimetry, Pacific Northwest Laboratory Report PNL-SA-9950, p. 36, 1981, and U.S. Pat. No. 4,350,607, Sept. 21, 1982] proposed a method of exploiting the phenomenon of radiation induced cavitation for application in neutron dosimetry. His approach was to place the superheated liquid drops into a viscous fluid or a soft gel in order to immobilize the droplets for a sufficiently long period of time to be usable as a neutron dosimeter. When neutrons strike the liquid drops, the drops volatilize and produce gas bubbles which rise through the medium to collect above it or which expand the entire medium by an equivalent volume. Apfel proposed using the volume of evolved gas, as a measure of the neutron dose. Apfel's studies have led to a better understanding of the dynamics of the process of vapour bubble nucleation, [R. E. Apfel, B-T. Chu and J. Mengel, "Superheated Drop Nucleation for Neutron Detection", Applied Scientific Research 38, p. 117, 1982; S. C. Roy and R. E. Apfel, "Semi-Empirical Formula for the Stopping Power of Ions", Nuclear Instruments and Methods in Physics Research B4, p. 20, 1984] and he has developed neutron detectors using superheated drops in soft gels [R. E. Apfel and S. C. Roy, "Instrument to detect vapour nucleation of superheated drops", Review of Scientific Instruments 54, p. 1387, 1984; R. E. Apfel and S. C. Roy, "Investigations on the Applicability of Superheated Drop Detectors in Neutron Dosimetry", Nuclear Instruments and Methods in Physics Research 219, p. 582, 1984]. Instead of using volume change as initially proposed, his detectors use a piezoelectric sensor to convert the acoustic signal emitted by the droplet explosion into an electrical signal which must be processed electronically before being counted. Thus, the operation of his detectors requires elaborate electronic instrumentation. Furthermore, this method of detection provides little spatial information about neutrons or their reaction products.

SUMMARY OF THE INVENTION

A direct reading detector/dosimeter for neutron and other high LET radiation has been developed comprising, (a) an elastic substantially transparent or translucent solid medium, and (b) discrete droplets of a superheated detector liquid insoluble in, and substantially uniformly dispersed in, said solid medium; the latter being capable of immobilizing the products of vaporization of each droplet and suffering substantially permanent detectable damage or deformation at each droplet site due to said vaporization, said damage or deformation being sufficient to allow detection thereof for an extended period. The number of immobilized vaporized droplets, or the number of damage sites, provides a convenient means of measuring the neutron dose.

The detector/dosimeter can be in an inactive stable form suitable for storage wherein said solid medium containing the dispersed superheated droplets is confined and under pressure sufficient to prevent vaporization of the detector liquid.

The selected solid medium suitably is formed by polymerization or by cross-linking of at least one monomer or polymer dissolved in a solvent liquid in which the detector liquid is insoluble and dispersed as droplets.

The invention includes a method of preparing the detector/dosimeter which comprises:

(i) providing a precursor of the solid medium in a polymerizable liquid form;

(ii) forming droplets of the detector liquid throughout said liquid precursor under conditions of temperature and pressure which preclude vaporization of the detector liquid;

(iii) polymerizing said liquid precursor to form said solid medium while entrapping said droplets throughout this solid medium; and (iv) activating the detector/dosimeter by raising the temperature or decreasing the pressure of the resulting solid medium to provide that the droplets are in superheated form. The method may include the step (v) of maintaining a selected pressure on the solid medium containing the dispersed droplets sufficient to prevent vaporization of detector liquid, thereby providing the detector/dosimeter in an inactive form suitable for storage or to improve the detector characteristics regarding (a) stability with time, or (b) the energy or type of radiation to be detected.

DETAILED DESCRIPTION AND PREFERRED EMBODIMENTS

Figure 1:
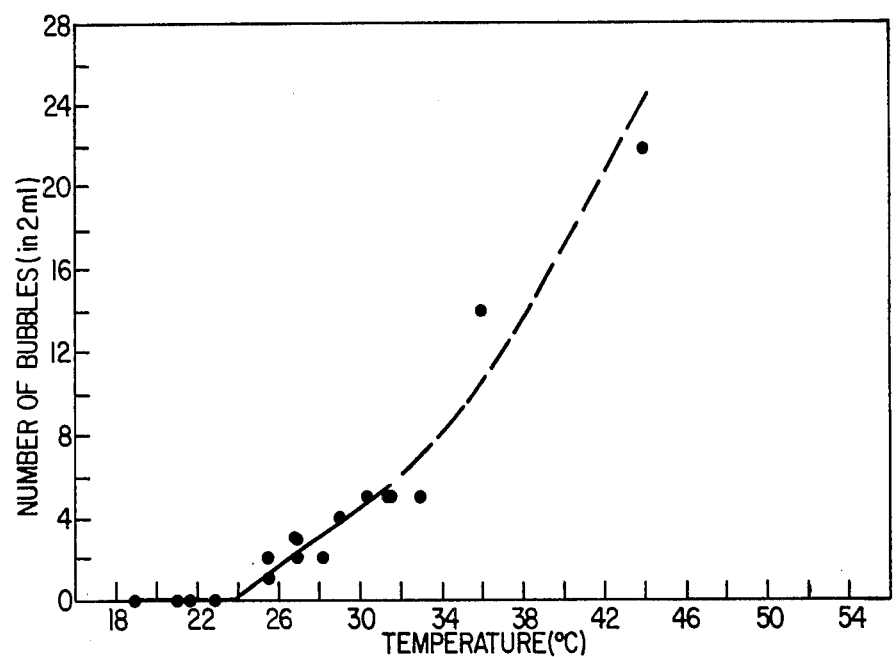
FIG. 1 is a graph showing the detector/dosimeter response (no. of bubbles) to neutron radiation, at increasing temperatures.

The detector liquid should be insoluble (immiscible) in the solid medium and in the liquid precursors thereof, and should have a boiling point below the ambient temperature during use. Suitable detector liquids usually are selected from volatile hydrocarbons and halogenated hydrocarbons, e.g. butane and substituted butanes, isobutane, propane and various fluorinated/chlorinated hydrocarbons. Boiling points normally will be within the range of about $-60°$ C. to $+15°$ C.

Any elastic substantially transparent or translucent solid medium in which detector liquid droplets can be dispersed, may be used. It is preferable to use a liquid precursor of the solid (such as a liquid monomer or polymer solution which can be polymerized or cross-linked to elastic solid form) as a continuous medium into which the detector liquid can be dispersed or emulsified. The liquid precursor is then polymerized or cross-linked to entrap the dispersed droplets of detector liquid. Vinylic monomers are suitable, e.g. acrylics such as acrylamides and methylmethacrylate, vinyl alcohol, vinylethylcarbitol, vinylpyrrolidone, styrene-divinylbenzene, etc. Solutions of monomers, polymers or mixtures thereof in which the detector liquid is insoluble are preferred, e.g. aqueous solutions of acrylamide plus a bisacrylamide. Solutions of polymers such as dextran or agarose wherein the polymer can be cross-linked in situ to form an elastic solid continuous phase can also be used.

Solvent in the precursor liquid preferably is aqueous but could be selected from other solvents such as alcohols, acetonitrile, dimethylformamide, dimethylsulfoxide and dioxane (when used with an insoluble detector liquid). Boron chloride (liquid) could also be used.

Various polymerization catalysts and cross-linking agents known to the art can be used. These will include ammonium persulfate, radiation to which the detector liquid is insensitive, peroxides, ethylenediacrylate, riboflavin+light, tetramethylethylenediamine, etc.

The amount of the discrete droplets may be varied over a wide range to suit the particular application. Normally the amount of the droplets will be within the range of about 0.02 to about 30% by vol. The droplet size is not critical but usually will be within the range of about 1 to about 100 microns diameter. For neutrons, it is expected that the optimum size will depend on the neutron energy: usually this optimum will be within the range of about 1 to about 100 microns.

To produce a practical working neutron dosimeter based upon a solid medium impregnated with superheated liquid droplets, we have developed the following as a preferred approach. Aqueous solutions of water-soluble monomers and heavy solutes can be caused to polymerize by addition of suitable catalysts to form a firm elastic medium. Prior to polymerization, the detector liquid is added. Because the detector liquid has a low boiling point, the monomer solution is cooled sufficiently to delay polymerization and also to allow addition of the detector liquid at ambient pressure. The screw-cap glass tube (or other suitable container) containing these agents is sealed and warmed slightly, preferably with vigorous vortex mixing. As the aqueous solution warms or melts, the water-insoluble detector liquid is blended in to form a fairly uniform suspension of droplets. These droplets in many cases would settle out if the density of the aqueous solution were not closely matched to the density of the detector liquid, e.g. by prior addition of heavy solutes, preferably a cesium salt. Excess detector liquid is then added at a temperature below its boiling point without further mixing. After sealing the container and standing at about 15° C. for about 5-10 mins, the resultant detector is a firm, elastic, translucent medium, polymerized in situ, which is stable for at least seven weeks. It is activated (made sensitive to radiation) by pouring off excess detector liquid which decreases the internal pressure and causes superheating of the detector droplets.

In preparing the detector or dosimeter, we have found that after the detector liquid is added, it is not necessary to mix actively the detector liquid as droplets throughout the liquid precursor: sufficient dispersion takes place passively from an overlay of detector liquid so that droplets are formed in situ. Detectors formed by this simpler procedure have lower sensitivity but are useful in some applications.

The detector/dosimeter may be used with or without appropriate containing means. Normally a container which can be pressurized will be used to increase storage life and the pressure released to activate the system.

Irradiation by neutrons causes volatilization of the droplets and the rapid formation of small bubbles within the host detector medium which cause local damage or deformation. The bubbles remain at their sites and can be counted visually or by other means. Damage sites can also be used as a method of dosimeter reading. The use of these firm, elastic, neutron radiation penetrable, translucent hosts (polyacrylamide is an example) has many advantages over the prior art including:

(1) they are firm, elastic, stable, non-biodegradable and can readily be prepared in containers or moulds of any suitable shape, (2) they allow wide flexibility in the preparation of host detection media with different strengths and elastic properties, (3) they can be assembled at low temperatures, even in the frozen state, in sealed or unsealed vessels, then uniformaly dispersed and allowed to set in situ, (4) they allow the addition of other ingredients such as lithium salts to give desirable characteristics to the neutron response, (5) they are translucent and allow the number of bubbles resulting from the interactions to be used as a measure of radiation fluence or dose, (6) they are firm and elastic and confine the bubbles even for long periods of time under appropriate conditions, e.g. under an overlay of heavy liquid. The softer media proposed by Apfel allow bubbles to migrate and coalesce destroying a linear relationship between bubble number and radiation dose, (7) in the firmer solid media, local, fractural damage leaves an essentially permanent record of dose reading, such damage being the result of volatilization of droplets causing surrounding host material to be distorted beyond its elastic limit, (8) after preparation they can be removed from the container and cut into any suitable configuration for use. The softer media proposed by Apfel require special containers to support the host medium and the container is an inseparable part of the detector.

In the less firm, more elastic solid media, the gas bubbles formed after radiation exposure were even more stable than in the firmer media. Bubble stability could be extended e.g. to 3-4 months, by overlaying with one or more layers of liquid such as a concentrated metal salt (e.g. cesium chloride) solution, liquid mercury or a highly volatile liquid such as Freon 114 (dichlorodifluoromethane). When these overlayers are present increased post-exposure stability and prolonged readability result. In cases where the bubbles apparently had collapsed or disappeared, it was found they could be caused to re-appear throughout the solid medium by reducing the external pressure. Under a suitable high pressure, the bubbles can be recompressed into droplets which can be used again to detect neutrons (regeneration of detector).

These overlay liquids may be concentrated solutions of metal salts such as cesium chloride, cesium carbonate, cesium formate, rubidium bromide and lithium bromide, or mercury (liquid). These salts may also serve as heavy solutes in adjusting the density of precursor during the preparation.

We have observed that detectors using dichlorodifluoromethane as the detector liquid and polyacrylamide as host detector medium network in a sealed but unpressurized tube, respond to neutrons at all temperatures above 0° C. Detectors using dichlorotetrafluoroethane as the detector liquid and polyacrylamide as the solid continuous medium network at normal atmospheric pressure, respond to neutrons only above 24° C. However, they will respond at lower temperatures if the tubes are evacuated. Detector sensitivity increases with increasing temperature as is shown in FIG. 1. This dependence upon temperature can be reduced by the use of a suitable organic pressurizing agent over the detector medium to reduce the dependence of vapor pressure upon temperature of the detector liquid. Detector sensitivity does not appear to be different if one uses 10% polyacrylamide or 4% polyacrylamide. Bubbles form in both media when the detector liquid is superheated to produce a vapor pressure of approximately 1.2 atmospheres.

Detector sensitivity increases with increasing amount of detector liquid, e.g. where 0, 0.001, 0.003, 0.01 and 0.02 ml detector liquid were used in 2 ml of host detector medium and especially over the range 0.01 to 0.1 ml in 2 ml.

Depending upon the choice and concentration of detector liquid, detection sensitivity can be made to vary over several orders of magnitude. Sensitivities obtained have ranged from less than 0.1 to over 10 bubbles per ml of detector medium per mrem of Pu-Be neutrons.

Figure 2:
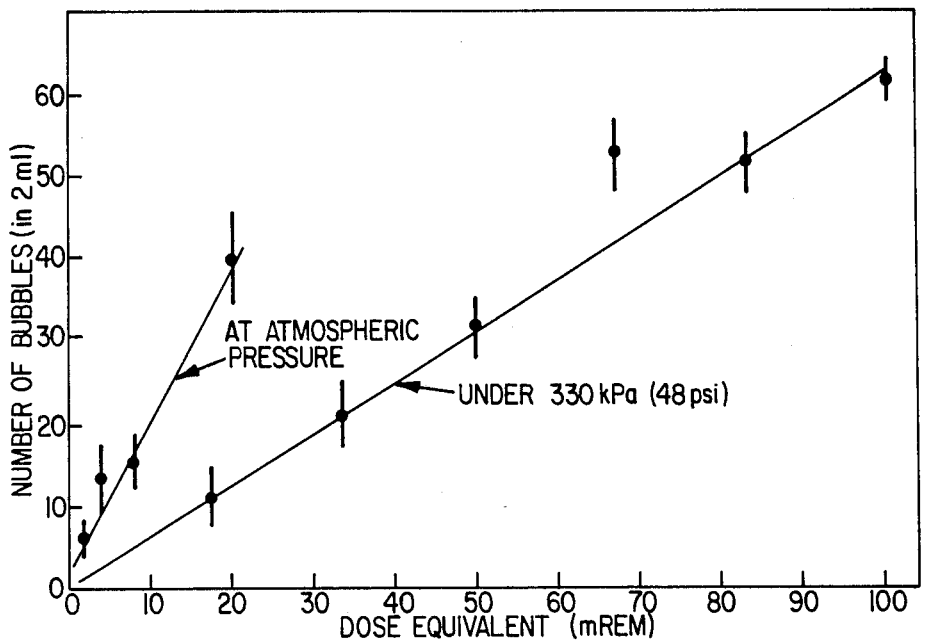
FIG. 2 is a graph showing the response (no. of bubbles) at two pressures as the radiation dose is varied.

The response of the detector is essentially linearly proportional to neutron dose as can be seen from FIG. 2.

Figure 3:
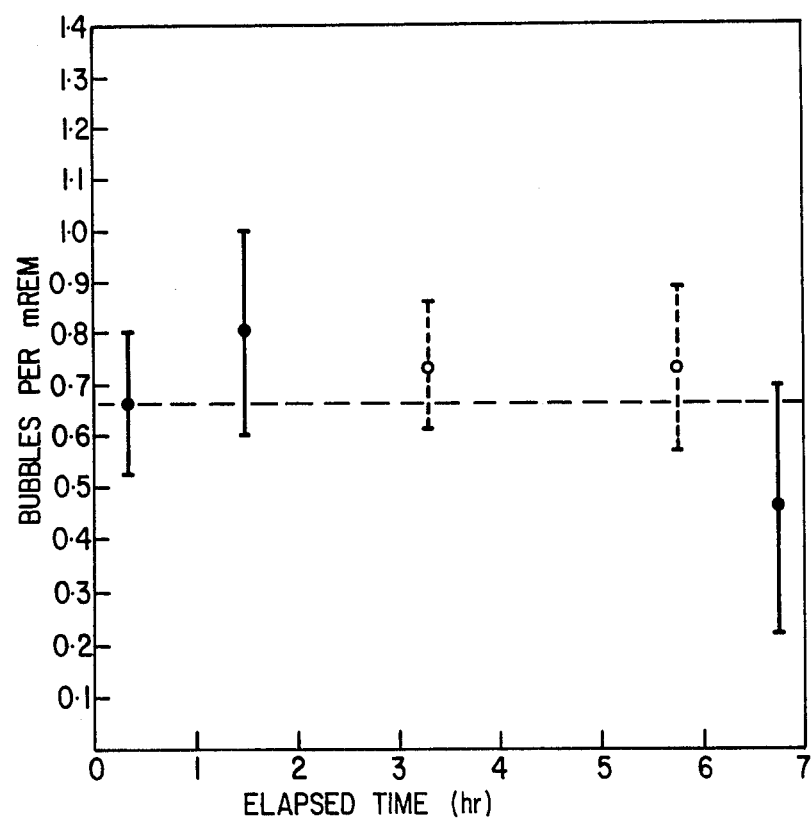
FIG. 3 is a graph showing the sensitivity (bubbles per unit dose) at various elapsed times after activating the detector.

Data that we have suggest that the change in detection sensitivity is not noticeable over a period of up to seven hours after activation as can be seen from FIG. 3. In other experiments, by using an appropriate overlay, e.g. mercury, detection sensitivity has been found to be stable up to seven days.

EXAMPLE 1

Reagents

A. Acrylamide Solution

Acrylamide (50 g), methylenebisacrylamide (3.7 g) and 12.5 g of 1 M sodium phosphate buffer (pH 6.8) were dissolved in double distilled water (final volume was 250 ml). The solution was clarified by passage through a 0.45 micron membrane filter.

C. Saturated Cesium Chloride Solution 50 g of CsCl were added to 25 ml of double distilled water. They were mixed and left to stand at room temperature for at least 30 min.

D. Detector Liquid

Dichlorodifluoromethane was collected and held in a test tube prechilled in a dry ice/ethanol bath.

P. Ammonium persulfate

A 10% solution (w/v) was prepared weekly and stored at 4° C.

Preparation of Detector

Solutions A and C were mixed in proportions to match the density of the detector liquid D. Appropriate volumes were determined by trial and error by mixing A and C in different ratios, and adding these mixtures to a screw cap test tube along with a small volume of D. Proper precautions were taken against explosion if a high vapor pressure was expected from mixing. The appropriate ratio of A and C in the mixture is one in which D hovers and neither sinks nor floats. 2 ml of the mixture was then transferred to a 13×100 mm screw cap test tube and 0.02 ml of solution P added.

The contents of the test tube were then outgassed using a water aspirator as a vacuum source. 0.02 ml of tetramethylenediamine (TEMED) were then added and mixed thoroughly but gently to avoid re-aeration of the sample. The contents of the tube were then frozen in the dry ice/ethanol bath.

The desired volume of D was then added to the tube and the cap secured. For a volume of A plus C of 2 ml, the volume of D was usually arranged to be about 0.1 ml.

The contents of the tube were warmed in a water bath at room temperature until the contents were partially thawed. The contents were then vortexed vigorously as they thawed to obtain a substantially uniform dispersion of D as fine droplets. The contents were then frozen again in the dry ice/ethanol bath.

The tube was then uncapped and 0.7 ml of D was added. The cap was then resecured. The tube and contents were handled gently to avoid any shaking.

The tube and contents were transferred to a water bath at 15° C. to allow the contents to thaw and polymerization to occur. Polymerization was visible after 5-10 minutes and was complete by about 60 minutes. The detector is stable as long as excess D remains. The detector is activated by uncapping the tube, pouring off D and either recapping immediately or after the addition of another liquid having a lower vapor pressure.

EXAMPLE 2

(a) A detector was prepared in a 13×100 mm hard glass screw-cap test tube using a 1:1 (by volume) mixture of Freon-12 and Freon-114 as the detector liquid in a detector medium made with 10% polyacrylamide; the detector medium was pressurized with excess Freon-114. Bubbles developed in the detector over a 2 hr period, after irradiation by 20 mrem of Pu-Be neutrons. The size of the bubbles stabilized after a period of about 1 day. Some of the bubbles disappeared after a period of several weeks, but could be made to reappear by pouring out the excess Freon-114.

(b) No dosimeters studied responded to gamma radiation doses up to 2.5 Gy.

(c) Detectors using Freon-12 as the detector liquid and polyacrylamide as the detector medium in a sealed but not pressurized tube responded to neutrons at all temperatures above 0° C.

(d) Detectors using Freon-114 as the detector liquid and polyacrylamide as the detector medium at normal atmospheric pressure responded to neutrons only above 24° C. However, they responded at room temperature if the tubes were evacuated. The detector sensitivity increased with increasing temperature as shown in FIG. 1. This large dependence with temperature can be reduced by the use of a suitable organic pressurizing agent (e.g. Freon-114 when Freon-12 is used as the droplet) over the detector medium to reduce the dependence of vapor pressure with temperature of the detector liquid.

(e) The detection sensitivity did not appear to be different for media prepared using 10% polyacrylamide or 4% polyacrylamide. Bubbles formed in both media when the detector liquid was superheated by approximately 1.2 atmospheres.

(f) The sensitivity of the detector increased with the amount of detector liquid added over the range of 0.001–0.02 ml to 2.0 ml of solid medium.

(g) The response of the detector was proportional to the neutron dose as shown in FIG. 2 where results for two identical detectors (containing Freon-12) operated either at atmospheric pressure or under a nitrogen atmosphere of 48 psi.

(h) Available data indicate that the detection sensitivity is stable over a period of at least seven hours (e.g. FIG. 3). In this experiment (FIG. 3) the detector used was as in (a).

(i) Depending on the choice and concentration of detector liquid, detection sensitivity can be made to vary over several orders of magnitude. Sensitivities obtained have ranged from less than 0.1 bubbles to over 10 bubbles per ml of detector medium per mrem of Pu-Be neutrons.

Detector/dosimeter as used herein is defined as a device which is intended to permit both qualitative and quantitative measurements of neutrons, and other high LET particles; that is, it would "detect" the presence of such particles and provide a direct indication of their presence, and also provide quantitative indication of "dose" when the number of bubbles is counted.

The device may be in the form of a film which can be used for neutron radiography, or in the form of a large volume medium (sphere or block) for high energy physics applications (i.e. to follow particle tracks).

We claim:

1. A direct reading detector/dosimeter for neutrons and other high LET radiation comprising:
   (a) an elastic substantially transparent or translucent solid medium, and
   (b) discrete droplets of a superheated detector liquid insoluble in, and substantially homogeneously dispersed in, said solid medium;

said solid medium being selected to immobilize the product of vaporization of each droplet and suffering substantially permanent detectable damage or deformation at each droplet site due to said vaporization, said damage or deformation giving a lasting measure of the radiation dose.

2. The detector/dosimeter of claim 1 in inactive stable form suitable for storage wherein said solid medium containing the dispersed superheated droplets is confined and under pressure sufficient to prevent vaporization of the detector liquid.

3. The detector/dosimeter of claim 1 wherein said solid medium comprises a selected polymer.

4. The detector/dosimeter of claim 3 wherein said polymer is selected from vinylic polymers.

5. The detector/dosimeter of claim 4 wherein said polymer comprises a copolymer of both acrylamide and a bisacrylamide.

6. The detector/dosimeter of claim 3 wherein said polymer is cross-linked.

7. The detector/dosimeter of claim 6 wherein said polymer is selected from the group consisting of polyvinyl alcohol, polyvinylethyl-carbitol, polyvinylpyrrolidone, dextran and agarose in cross-linked form.

8. The detector/dosimeter of claim 3 wherein said solid medium includes solvent liquid selected from water and aqueous solution.

9. A method of preparing a direct reading detector/dosimeter for neutrons and other high LET radiation, said detector comprising:

(a) an elastic substantially transparent or translucent solid medium, and (b) discrete droplets of a superheated detector liquid insoluble in, and substantially homogeneously dispensed in, said solid medium; said solid medium being selected to immobilize the product of vaporization of each droplet and suffering substantially permanent detectable damage or deformation at each droplet site due to said vaporization, said damage or deformation giving a lasting measure of the radiation dose;

said method of preparing comprising:

(i) providing a precursor of the solid medium in a polymerizable liquid form, (ii) forming droplets of the detector liquid throughout said liquid precursor under conditions of temperature and pressure which preclude vaporization of the detector liquid, (iii) polymerizing said liquid precursor to form said solid medium while entrapping said droplets throughout this solid medium, and (iv) when a storage interval is desired maintaining pressure on the solid medium containing the dispersed droplets sufficient to prevent vaporization of detector liquid, and (v) activating the detector/dosimeter by raising the temperature of or decreasing the pressure on the resulting solid medium to provide that the droplets are in superheated form.

10. The method of claim 9 wherein for step (ii) the density of the precursor is increased by addition of a dense solute to match the density of the detector liquid in order to facilitate stable dispersion formation.

11. The method of claim 10 wherein said dense solute is a cesium salt.

12. The method of claim 9 wherein during step (ii) the system is chilled to below the detector liquid boiling point, then detector liquid is added, and the system warmed and dispersed droplets formed.

13. The method of claim 9 wherein, for step (iv), a layer of excess detector liquid is used to maintain pressure on the solid medium.

14. The method of claim 13 wherein the layer of excess detector liquid is replaced at step (v) by a different immiscible liquid of lower vapor pressure to alter the detection characteristics of the dosimeter.

* * * * *